(12) United States Patent
Minegishi

(10) Patent No.: US 10,732,914 B2
(45) Date of Patent: Aug. 4, 2020

(54) INFORMATION PROCESSING APPARATUS CONFIGURED TO DETERMINE A CHARACTER CODE COMPATIBLE WITH AN EXTERNAL DEVICE, METHOD, AND NON-TRANSITORY RECORDING MEDIUM STORING INSTRUCTIONS FOR EXECUTING AN INFORMATION PROCESSING METHOD

(71) Applicant: Youichi Minegishi, Kanagawa (JP)

(72) Inventor: Youichi Minegishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/440,138

(22) Filed: Jun. 13, 2019

(65) Prior Publication Data

US 2020/0004485 A1 Jan. 2, 2020

(30) Foreign Application Priority Data

Jun. 28, 2018 (JP) ................................ 2018-123116

(51) Int. Cl.
*G06F 3/12* (2006.01)

(52) U.S. Cl.
CPC .......... *G06F 3/1297* (2013.01); *G06F 3/1293* (2013.01)

(58) Field of Classification Search
None
See application file for complete search history.

(56) References Cited

U.S. PATENT DOCUMENTS

| | | | |
|---|---|---|---|
| 9,367,266 B2* | 6/2016 | Nakata | G06F 3/1204 |
| 2003/0030830 A1 | 2/2003 | Yamamura | |
| 2005/0168777 A1 | 8/2005 | Nishikawa et al. | |
| 2013/0308149 A1* | 11/2013 | Aoyama | G06F 40/14 |
| | | | 358/1.13 |
| 2014/0101190 A1* | 4/2014 | Onoda | G06F 16/9566 |
| | | | 707/758 |
| 2018/0302521 A1* | 10/2018 | Thamizhanandan | |
| | | | H04N 1/00498 |

FOREIGN PATENT DOCUMENTS

| | | |
|---|---|---|
| JP | 2006-031427 | 2/2006 |
| JP | 2012190224 A | 10/2012 |
| JP | 2012-216106 | 11/2012 |

OTHER PUBLICATIONS

Extended European Search Report dated Nov. 28, 2019, issued in corresponding European Patent Application No. 19180571.2.

* cited by examiner

*Primary Examiner* — Henok Shiferaw
(74) *Attorney, Agent, or Firm* — Harness, Dickey and Pierce, P.L.C.

(57) ABSTRACT

An improved information processing apparatus, method, and a non-transitory recording medium storing instructions for executing an information processing method are provided. The information processing apparatus acquires setting information on a language displayed on a display device by the information processing apparatus, acquires correspondence information stored in a conversion table indicating correspondence between the language and a code page, determines a target character code based on the acquired setting information and the correspondence information, and converts a character code of data to be output to an external device into the identified target character code.

20 Claims, 14 Drawing Sheets

408

| DISPLAY LANGUAGE | LANGUAGE ID | CODE PAGE |
|---|---|---|
| JAPANESE | 0x0411 | 932 |
| KOREAN | 0x0412 | 949 |
| CHINESE (TRADITIONAL) | 0x0804 | 936 |
| CHINESE (SIMPLIFIED) | 0x0404 | 950 |
| | 0x0c04 | |
| | 0x1404 | |
| ... | ... | ... |
| DEFAULT | OTHER | 932 |

| DISPLAY LANGUAGE | LANGUAGE ID | CODE PAGE |
|---|---|---|
| JAPANESE | 0x0411 | 932 |
| KOREAN | 0x0412 | 949 |
| CHINESE (TRADITIONAL) | 0x0804 | 936 |
| CHINESE (SIMPLIFIED) | 0x0404 | 950 |
| | 0x0c04 | |
| | 0x1404 | |
| ... | ... | ... |
| DEFAULT | OTHER | 932 |

FIG. 6

```
┌─────────────────────────────────────────────────────┐
│ Area                                              × │
│                                                     │
│ ┌Format┐ Location │ Administration │                │
│                                                     │
│  ┌ ─ ─ ─ ─ ─ ─ ─ ─ ─ ─ ─ ─ ─ ─ ─ ─ ─ ─ ─ ─ ─ ─ ─ ┐  │
│  │ Format(F):                                    │  │
│  │ ┌─────────────────────────────────────────┬─┐ │  │
│  │ │ Japanese (Japan)                        │▽│ │  │
│  │ └─────────────────────────────────────────┴─┘ │  │
│  └ ─ ─ ─ ─ ─ ─ ─ ─ ─ ─ ─ ─ ─ ─ ─ ─ ─ ─ ─ ─ ─ ─ ─ ┘  │
│  Change order of display                            │
│  Format Settings                                    │
└─────────────────────────────────────────────────────┘
```

- 601 (window)
- 602 (tab area)

Format(F): Japanese (Japan)

Change order of display
Format Settings

Date and time

| Field | Value |
|---|---|
| Date (short format)(S): | yyyy/MM/dd |
| Date (long format)(L): | Month dd, yyyy |
| Time (short format)(H): | H:mm |
| Time (long format)(O): | H:mm:ss |
| First day of the week(W): | Sunday |

Examples

Date (short format):  2018/05/08
Date (long format):   May 8, 2018
Time (short format):  11:41
Time (long format):   11:41:53

Additional settings(D)...

[ OK ]   [ Cancel ]   [ Apply(A) ]

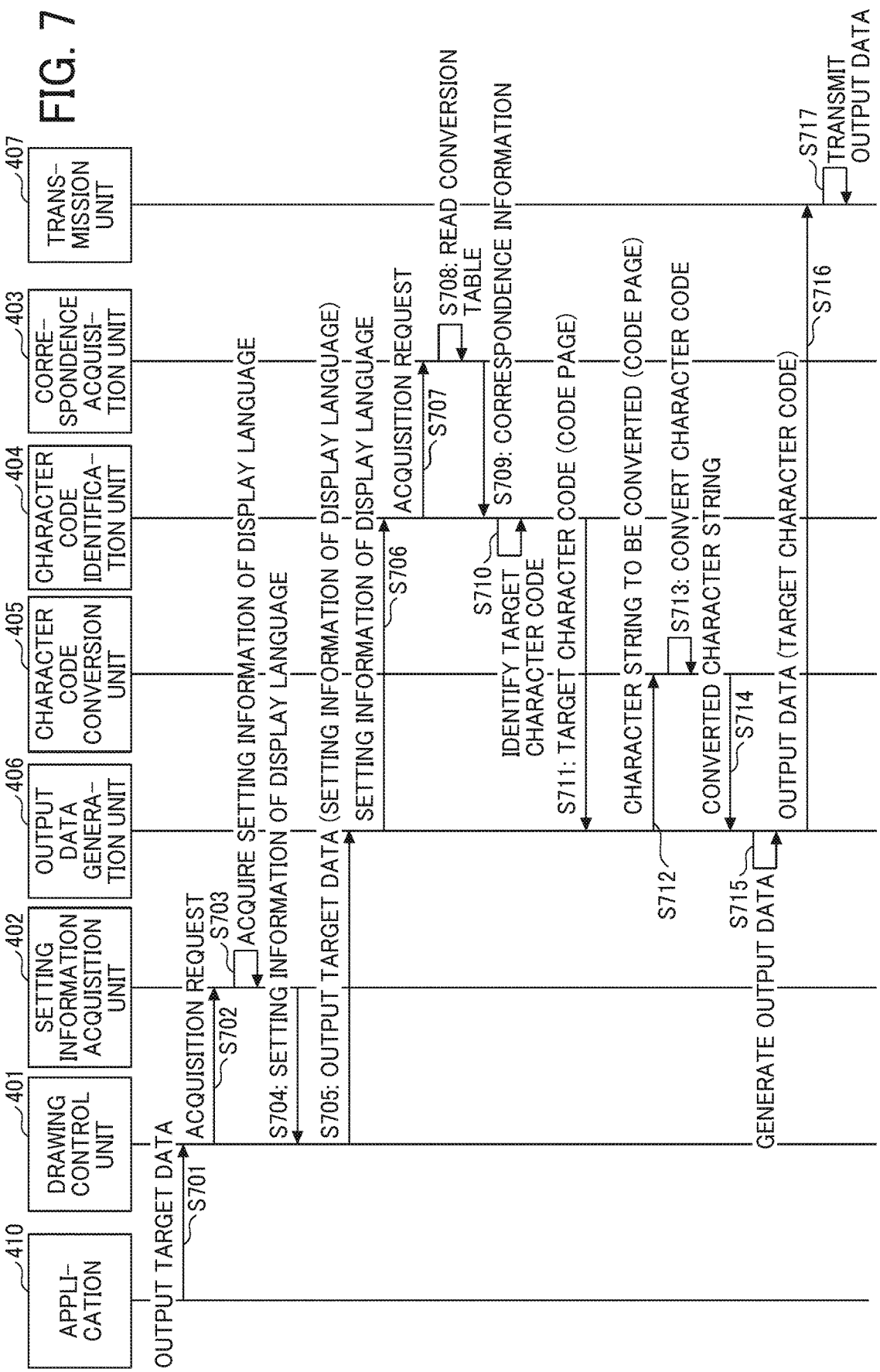

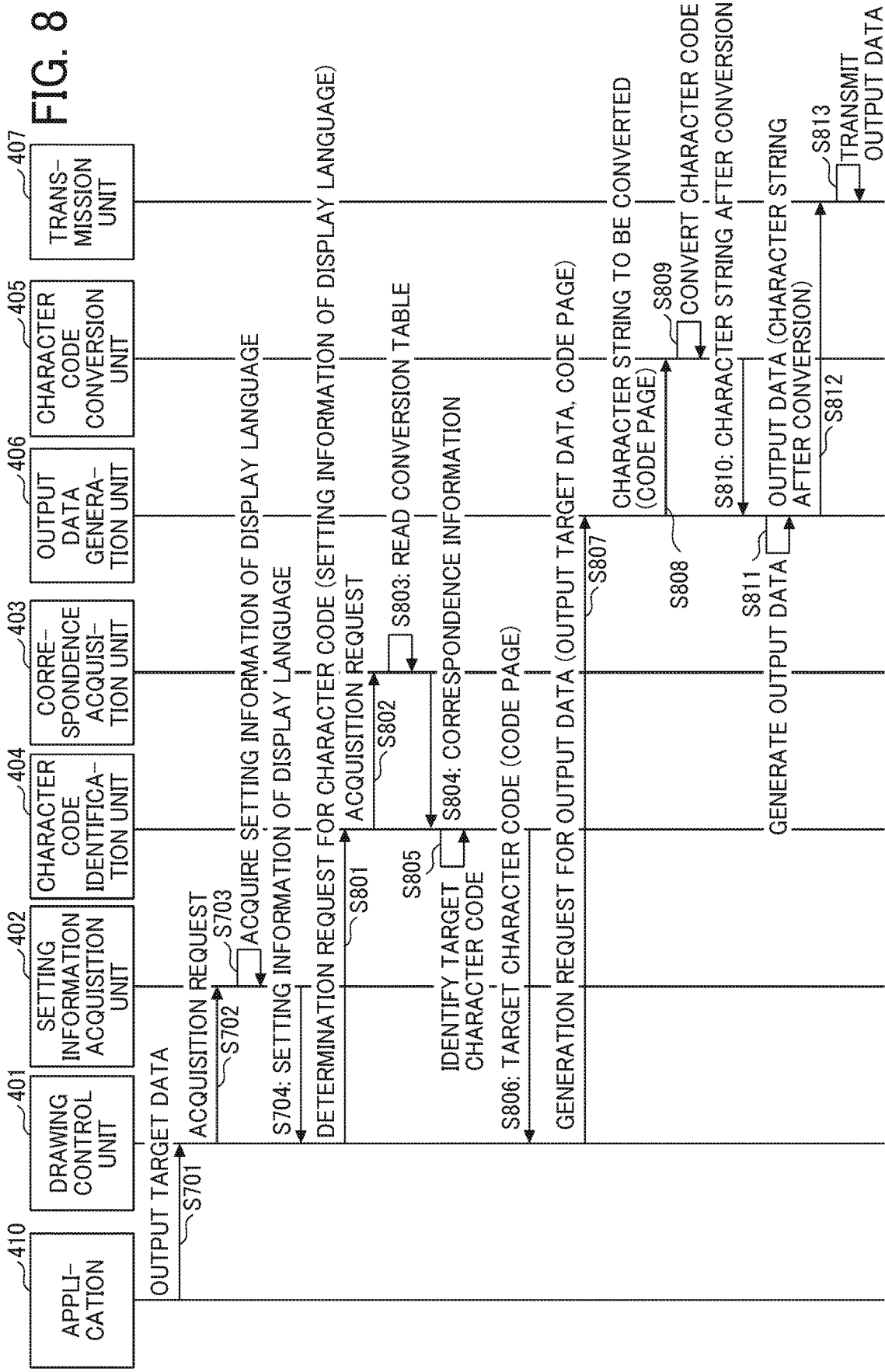

FIG. 14

| Function | No. | User name | Document name | Result | Details | No. of pages | No. of sets |
|---|---|---|---|---|---|---|---|
| 🖨 | 302 | ******** | ******** | Completed | — | 1 | 1 |
| 🖨 | 301 | ******** | ******** | Completed | — | 1 | 1 |
| 🖨 | 301 | ******** | ******** | Completed | — | 1 | 1 |
| 🖨 | 312 | ******** | ******** | Completed | — | 1 | 1 |
| 🖨 | 311 | ******** | ******** | Completed | — | 1 | 1 |
| 🖨 | 310 | ******** | ******** | Completed | — | 1 | 1 |
| 🖨 | 309 | ******** | ******** | Completed | — | 1 | 1 |
| 🖨 | 308 | ******** | ******** | Completed | — | 1 | 1 |
| 🖨 | 307 | ******** | ******** | Completed | — | 1 | 1 |
| 🖨 | 306 | ******** | ******** | Completed | — | 1 | 1 |

Job History

Return

Function: Print ▼

1/10  Page: [ ] GO  No. of items to display: 10 ▼

INFORMATION PROCESSING APPARATUS CONFIGURED TO DETERMINE A CHARACTER CODE COMPATIBLE WITH AN EXTERNAL DEVICE, METHOD, AND NON-TRANSITORY RECORDING MEDIUM STORING INSTRUCTIONS FOR EXECUTING AN INFORMATION PROCESSING METHOD

CROSS-REFERENCE TO RELATED APPLICATIONS

This patent application is based on and claims priority pursuant to 35 U.S.C. § 119(a) to Japanese Patent Application No. 2018-123116, filed on Jun. 28, 2018, in the Japan Patent Office, the entire disclosure of which is hereby incorporated by reference herein.

BACKGROUND

Technical Field

The present disclosure relates to an information processing apparatus, method, and a non-transitory recording medium storing instructions for executing an information processing method.

Background Art

In an information processing system including an image forming apparatus that executes printing and an information processing apparatus that executes a printer driver to control printing, the image forming apparatus changes the handling of the characters based on the settings of the character code output from the printer driver.

SUMMARY

Embodiments of the present disclosure describe an improved information processing apparatus, method, and a non-transitory recording medium storing instructions for executing an information processing method. The information processing apparatus acquires setting information on a language displayed on a display device by the information processing apparatus, acquires correspondence information stored in a conversion table indicating correspondence between the language and a code page, determines a target character code based on the acquired setting information and the correspondence information, and converts a character code of data to be output to an external device into the identified target character code.

BRIEF DESCRIPTION OF THE DRAWINGS

A more complete appreciation of the embodiments and many of the attendant advantages and features thereof can be readily obtained and understood from the following detailed description with reference to the accompanying drawings, wherein;

FIG. 5 is a diagram illustrating an example of a conversion table according to the first embodiment of the present disclosure;

FIG. 6 is a diagram illustrating setting information regarding a format according to the first embodiment of the present disclosure;

FIG. 7 is a first sequence diagram illustrating processing executed by the information processing apparatus according to the first embodiment of the present disclosure;

FIG. 8 is a second sequence diagram illustrating processing executed by the information processing apparatus according to the first embodiment of the present disclosure;

FIG. 14 is a diagram illustrating an example of a display screen of the image forming apparatus according to embodiments of the present disclosure.

Figure 1A:
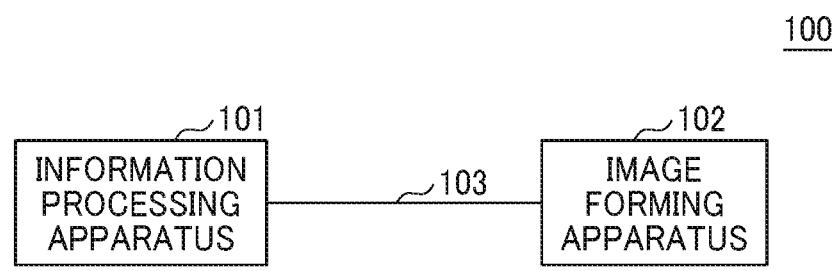
FIG. 1A and FIG. 1B are diagrams illustrating a system configuration of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Embodiments of the present disclosure are described below with reference to the attached drawings.

<System Configuration>

Figure 1B:
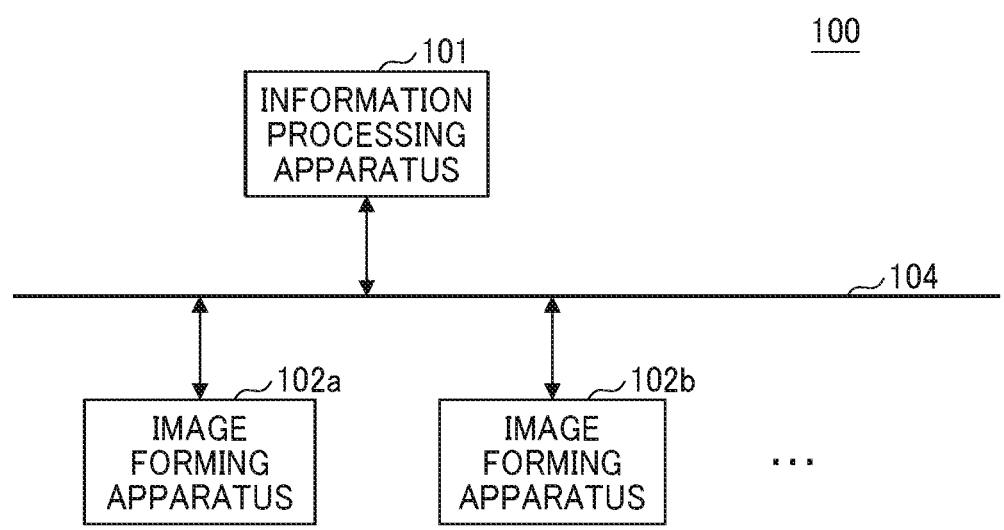

FIG. 1A and FIG. 1B are diagrams illustrating a system configuration of an information processing system according to embodiments of the present disclosure. In an information processing system 100 illustrated in FIG. 1A, information processing apparatus 101 and an image forming apparatus 102 for outputting (e.g., printing, displaying, etc.) characters based on data output from the information processing apparatus 101 are communicably connected through a communication path 103.

Here, the communication path 103 may be, for example, a wired communication such as Universal Serial Bus (USB), or may be wireless communication such as short distance wireless communication or wireless local area network (LAN).

The information processing apparatus 101 is a computer such as a personal computer used by a user and executes a printer driver, which is a program to control printing by the image forming apparatus 102.

The image forming apparatus 102 is, for example, an electronic device having an image forming function such as a multifunctional peripheral (MFP) including a scan function, a copy function, a print function, a facsimile function and the like in one body, a printer, a facsimile, or the like.

The image forming apparatus 102 stores font data for a plurality of character code sets in a storage unit. The font data stored in the storage unit is used to print or display characters according to the settings of the character code output from the printer driver of the information processing apparatus 101.

An example of a display screen displayed on an operation panel or the like by the image forming apparatus 102 in accordance with control from the information processing apparatus 101 is illustrated in FIG. 14. In the example illustrated in FIG. 14, a display screen 1400 displays a job history including a user name 1401 and a document name 1402 output from the information processing apparatus 101.

If the image forming apparatus 102 does not support the character code output from the printer driver of the information processing apparatus 101, characters such as the user name 1401 and the document name 1402 may be garbled on the display screen 1400.

Figure 15:
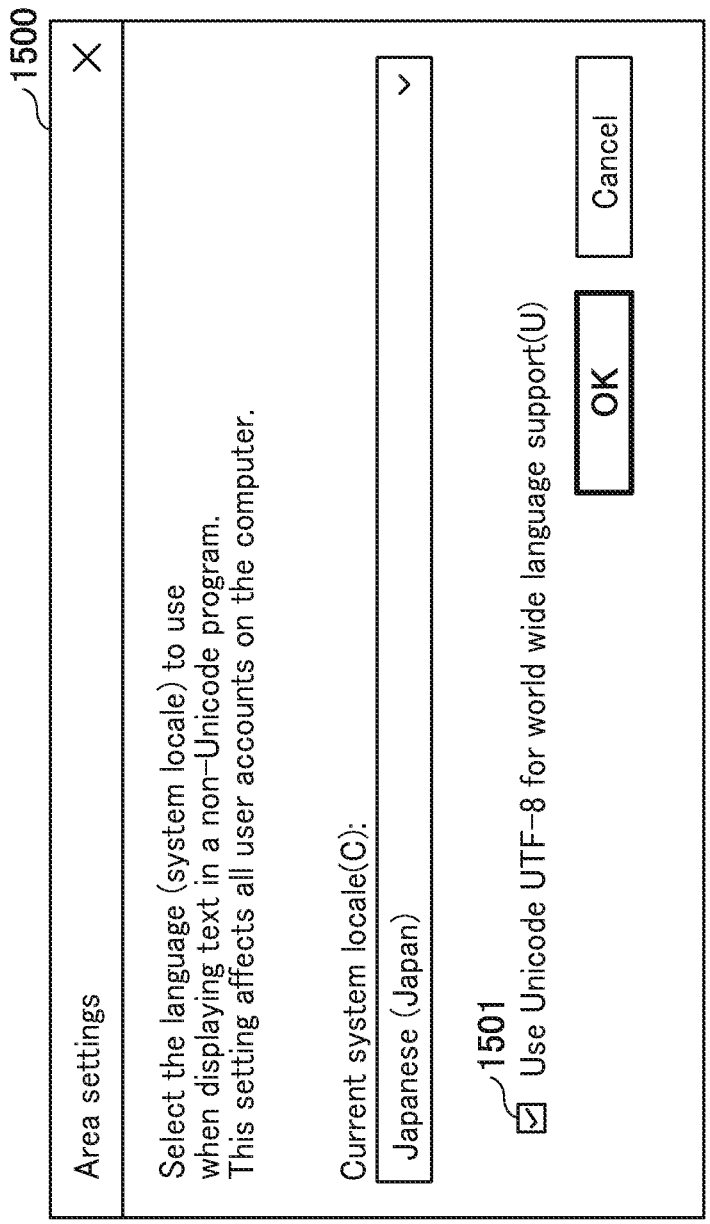
FIG. 15 is a diagram illustrating an example of a setting screen of a system locale according to embodiments of the present disclosure.

For example, in a system locale setting screen 1500 of operating system (OS) illustrated in FIG. 15, when a check box 1501 indicating "Use Unicode UTF-8 for World Wide Language Support" is selected, the character code for all character information from the OS becomes UTF-8. Therefore, for example, when the image forming apparatus 102 does not support the UTF-8 character code, the characters may be garbled.

Such a problem is not limited to the display of job histories, and may also occur in, for example, transmission of characters in a header or footer, transmission of log information, printing of print data, or the like using the image forming apparatus 102.

The information processing apparatus 101 may determine whether the target character code can be used by the image forming apparatus 102 based on setting data stored in advance indicating font data omitted in a code page of the image forming apparatus 102. Also, when the information processing apparatus 101 determines that the image forming apparatus 102 cannot use the character code after conversion, the information processing apparatus 101 prevents the characters from being garbled by converting the character code to another character code.

However, this technique cannot be used when the information processing apparatus 101 does not know which character codes can be handled by the image forming apparatus 102.

For example, when a printer driver supporting a plurality of models is installed in the information processing apparatus 101 and bi-directional communication with the image forming apparatus 102 is not enabled, the information processing apparatus 101 cannot identify which character codes the image forming apparatus 102 supports.

Therefore, the printer driver according to the present embodiment, for example, has the following configuration to reduce the incidence of garbled characters in the image forming apparatus 102 even when the information of the image forming apparatus 102 cannot be determined (i.e., the information cannot be acquired).

For example, the printer driver according to the present embodiment has a conversion table that stores correspondences between a display language and the code page and determines a target character code for conversion using the settings of the display language of the user acquired from the OS and the conversion table.

The conversion table includes, for example, an identifier (ID) for the display language "Japanese" and an identifier of the code page for a Japanese character code "Shift-JIS" (hereinafter simply referred to as "code page") along with correspondences of multiple languages.

In addition, when the settings of the display language of the user acquired from the OS is "Japanese", the printer driver acquires the code page for the display language "Japanese" using the conversion table. Furthermore, using the acquired code page, the printer driver converts the character code (for example, Unicode, UTF-8, etc.) used by the OS to the character code "Shift-JIS" for the display language "Japanese".

In general, when the display language of the user of the information processing apparatus 101 is Japanese, the image forming apparatus 102 used by the user supports the character code "Shift-JIS" for Japanese. Therefore, according to the present embodiment, even if the information processing apparatus 101 cannot identify the image forming apparatus 102 at the output destination and the character codes supported by the image forming apparatus 102 are not known, it is possible to reduce the incidence of garbled characters on the image forming apparatus 102 side.

The "display language" is an example of setting information related to the language displayed on the display device by the information processing apparatus 101, which is set in association with the user who uses the information processing apparatus 101.

The system configuration of the information processing system 100 illustrated in FIG. 1A is an example. Note that the information processing apparatus 101 may be connected to one or more image forming apparatuses 102a, 102b, and so forth through a network 104 as illustrated in FIG. 1B.

<Hardware Configuration>

(Hardware Configuration of Information Processing Apparatus)

Figure 2:
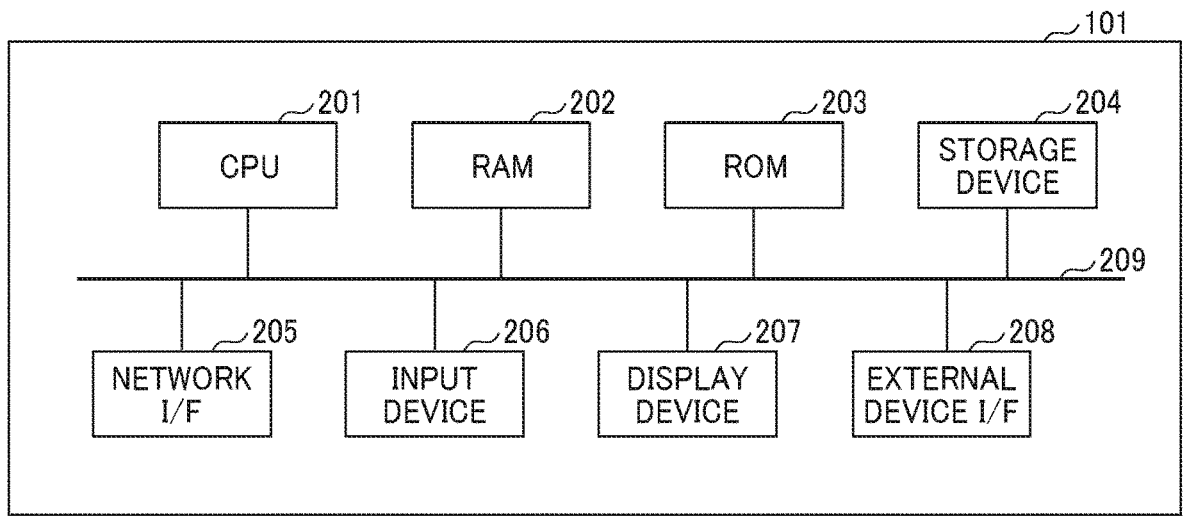
FIG. 2 is a block diagram illustrating a hardware configuration of an information processing apparatus according to embodiments of the present disclosure.

FIG. 2 is a block diagram illustrating a hardware configuration of an information processing apparatus according to the present embodiment. The information processing apparatus 101 includes, for example, a central processing unit (CPU) 201, a random access memory (RAM) 202, a read only memory (ROM) 203, a storage device 204, a network interface (I/F) 205, an input device 206, a display device 207, an external device I/F 208, a bus 209, and the like.

The CPU 201 is an arithmetic device that implements the functions of the information processing apparatus 101 by reading the programs and data stored in the ROM 203, the storage device 204, and the like onto the RAM 202 and executing processing. The RAM 202 is a volatile memory used as a work area or the like of the CPU 201. The ROM 203 is a nonvolatile memory capable of retaining programs and data even when the power is turned off.

The storage device 204 is a mass storage device such as a hard disk drive (HDD), a solid state drive (SSD), and the like, and stores the operating system (OS), an application program (hereinafter referred to as an application), various data, and the like. The network I/F 205 is an interface for connecting the information processing apparatus 101 to a network 104 and the like.

The input device 206 is, for example, a pointing device such as a mouse, or an input device such as a keyboard, and is used to input operating signals to the information processing apparatus 101. The display device 207 includes a display and the like and displays results produced by the information processing apparatus 101.

The external device I/F 208 is an interface for connecting an external device to the information processing apparatus 101. The external device includes, for example, a storage medium, the image forming apparatus 102, and the like. A bus 209 is connected to the above-described components and transmits an address signal, a data signal, various control signals, and the like.

(Hardware Configuration of Image Forming Apparatus)

Figure 3:
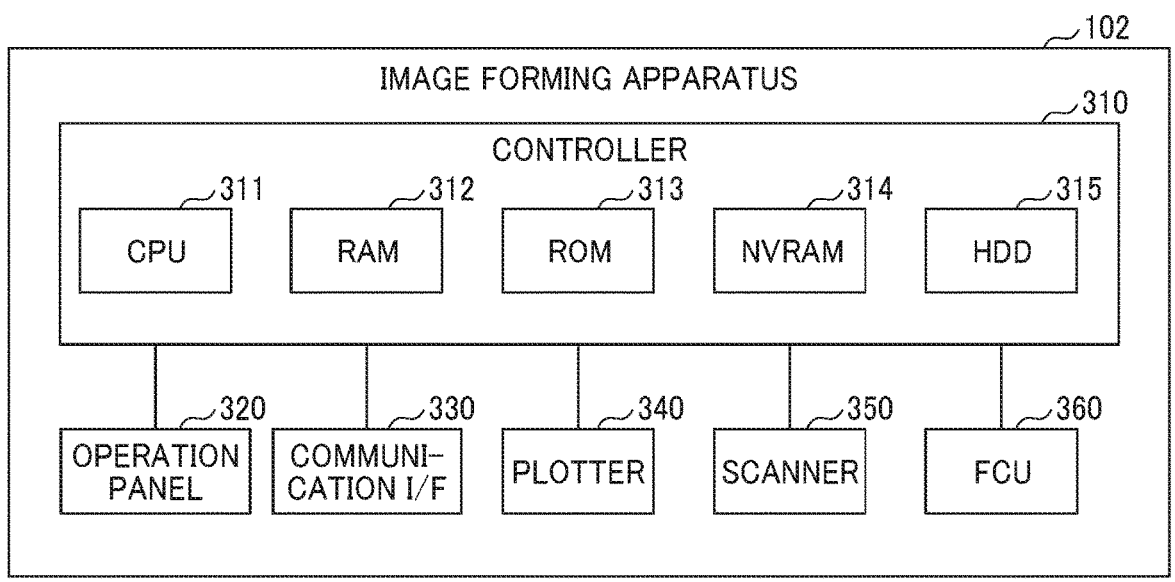
FIG. 3 is a block diagram illustrating a hardware configuration of an image forming apparatus according to embodiments of the present disclosure.

FIG. 3 is a block diagram illustrating a hardware configuration of an image forming apparatus according to embodiments of the present disclosure. The image forming apparatus 102 includes, for example, a controller 310, an operation panel 320, a communication I/F 330, a plotter 340, a scanner 350, and a facsimile control unit (FCU) 360.

The controller 310 has a computer configuration and includes, for example, a CPU 311, a RAM 312, a ROM 313, a nonvolatile RAM (NVRAM) 314, an HDD 315, and the like.

The ROM 313 is a nonvolatile storage device that stores various programs and data. The RAM 312 is a volatile storage device that temporarily holds programs and data. The NVRAM 314 is a writable nonvolatile storage device that stores setting information and the like, for example. The HDD 315 is a large capacity storage device that stores various programs and data.

The CPU 311 loads programs, data, or setting information from the storage device such as the ROM 313, the NVRAM 314 and the HDD 315 onto the RAM 312 and executes processing to implement entire control and functions of the image forming apparatus 102.

The operation panel 320 includes an input unit that receives a user input, and a display unit that displays various information. The communication I/F 330 is a communication interface for connecting the image forming apparatus 102 to the network 104.

The plotter 340 is a printing device that prints print data. The scanner 350 is a reading device that reads an original or the like. The FCU 360 transmits and receives facsimile data.

First Embodiment

Hereinafter, a functional configuration of the information processing apparatus 101 and the information processing system 100 according to a first embodiment is described.

<Functional Configuration>

Figure 4:
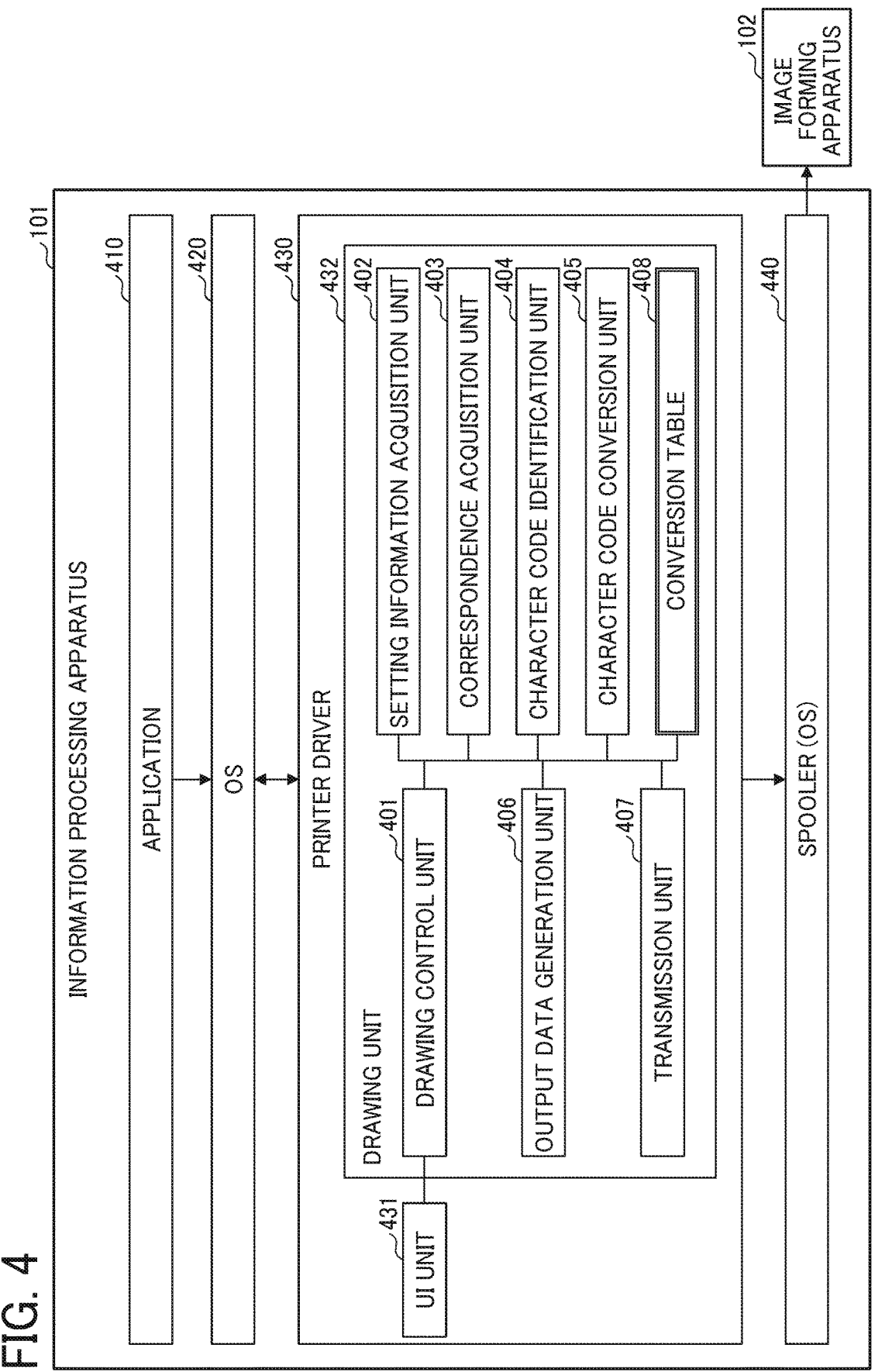
FIG. 4 is a block diagram illustrating a functional configuration of the information processing apparatus according to a first embodiment of the present disclosure.

FIG. 4 is a block diagram illustrating a functional configuration of the information processing apparatus according to the first embodiment. A description of the functional configuration of the image forming apparatus 102 is omitted here because any conventional image forming apparatus can be used in the present embodiment.

(Functional Configuration of Information Processing Apparatus)

In the information processing apparatus 101, for example, programs such as an application 410, an OS 420, and a printer driver 430 are executed by the CPU 201 illustrated in FIG. 2.

The application 410 is, for example, an office application for creating a document, a spreadsheet, a presentation and the like, and various application programs such as a web browser and a mailer. The application 410 can cause the image forming apparatus 102 to print, for example, a created document file or the like using the OS 420 and the printer driver 430.

The OS 420 is an operating system that controls the information processing apparatus 101. Here, the following description assumes that the OS 420 is Windows (registered trademark) OS, but the scope of the present disclosure is not limited to Windows OS. The present disclosure is also applicable to other OSs having similar features as Windows OS.

The printer driver 430 is a program for controlling printing by the image forming apparatus 102. The information processing apparatus 101 implements a UI unit 431, a drawing unit 432, and the like by, for example, the CPU 201 in FIG. 2 executing the printer driver 430.

The UI unit 431 displays a print setting screen for setting printing and receives print setting information set by the user. The print setting information received by the UI unit 431 is transmitted to the drawing unit 432 using, for example, a DEVMODE structure or PrintTicket through the OS 420.

The drawing unit 432 converts data to be output sent from the application 410 through the OS 420 into output data that can be output by the image forming apparatus 102. The drawing unit 432 includes, for example, a drawing control unit 401, a setting information acquisition unit 402, a correspondence acquisition unit 403, a character code identification unit 404, a character code conversion unit 405, an output data generation unit 406, and a transmission unit 407.

In addition, the drawing unit 432 includes, as an example, a display language-code page conversion table (hereinafter, simply referred to as a "conversion table") 408 as illustrated in FIG. 5. As another example, the conversion table 408 may be stored outside the drawing unit 432 or may be stored outside the printer driver 430. For example, when the printer driver 430 is a Version 4 printer driver (hereinafter, referred to as "V4 printer driver"), the conversion table 408 may be stored in DriverPropertyBag or the like.

FIG. 5 is a diagram illustrating an example of the conversion table according to the first embodiment. In the conversion table 408, the correspondence between the display language 501 and the code page 502 is stored.

The display language 501 includes, for example, a language ID (LANGID) indicating the display language of the user, which is acquired by a GetUserDefaultUILanguage function or the like, which is an application programming interface (API) of Windows OS.

For example, as illustrated in FIG. 5, the language ID "0x411" indicates "Japanese", and the language ID "0x412" indicates "Korean". Note that only the language ID may be stored in the display language 501 of the conversion table 408.

The code page (code page identifier) is an identifier for a character code. For example, the code page "932" indicates the character code "Shift-JIS", and the code page "949" indicates the character code "Unified Hangul Code".

Also, in general, since the information processing apparatus 101 supports more languages than the image forming apparatus 102 in many cases, one code page 502 may be assigned to a plurality of language IDs as in "Chinese (Simplified)" illustrated in FIG. 5.

Preferably, the conversion table 408 stores a default code page (a code page default value) 503 which is selected when there is no code page for the language ID.

Referring again to FIG. 4, the description of the functional configuration of the drawing unit 432 is continued.

The drawing control unit 401 receives output target data and print setting information sent from the application 410 through the OS 420, and controls at least a part of processing by the drawing unit 432.

The setting information acquisition unit 402 acquires setting information on the language used by the user. For example, the setting information acquisition unit 402 acquires the language ID indicating the display language of the user by using the above-described GetUserDefaultUILanguage function. The language ID which indicates a user's display language is an example of the setting information regarding the display language which the user is using.

As another example, a language ID indicating a default language of the user may be acquired using a GetUserDefaultLangID function which is the API of Windows OS. As a result, for example, it is possible to acquire the language ID of the language set in the "Format" 602 on an area setting screen 601 of the OS 420 as illustrated in FIG. 6. The language ID of the language set in "Format" 602 on the area setting screen 601 is stored in association with the user who is using the information processing apparatus 101 and is an example of date format information that the information processing apparatus 101 causes the display device 207 to display.

When the printer driver 430 is a V4 printer driver, the drawing unit 432 performs an impersonation process described hereinafter in a second embodiment and acquires setting information on the language used by the user.

In the first embodiment, the following description assumes that the printer driver 430 is a Version 3 printer driver (hereinafter, V3 printer driver) in Windows OS.

The correspondence acquisition unit 403 acquires, for example, the correspondence between the display language 501 and the code page 502 stored in the conversion table 408 as illustrated in FIG. 5. The conversion table 408 is an example of a storage unit that stores the correspondence of the display language and the code page.

The character code identification unit 404 identifies the target character code that the character code conversion unit 405 to be described below converts into, based on the language ID (one example of setting information) acquired by the setting information acquisition unit 402 and the correspondence acquired by the correspondence acquisition unit 403.

For example, when the language ID acquired by the setting information acquisition unit 402 is "0x411" ("411" in hexadecimal notation), the character code identification unit 404 acquires the code page "932" for the language ID "0x411" from the conversion table 408 illustrated in FIG. 5. As described above, since the code page "932" corresponds to the character code "Shift-JIS", the character code identification unit 404 can identify the target character code as "Shift-JIS".

The character code conversion unit 405 converts the character code of data to be output to the image forming apparatus 102 into the target character code identified by the character code identification unit 404. For example, the character code conversion unit 405 converts the character code by designating the code page "932" acquired by the character code identification unit 404 in the WideCharToMultiBite function, which is the API of Windows OS. Thereby, for example, the standard character code (for example, UTF-16, UTF-8, etc.) of Windows OS can be converted to the target character code (for example, "Shift-JIS") identified by the character code identification unit 404.

The output data generation unit 406 generates output data (for example, print data, text data, etc.) that can be output by the image forming apparatus 102 using the character string converted by the character code conversion unit 405.

The transmission unit 407 transmits the output data generated by the output data generation unit 406 to the image forming apparatus 102 through a spooler 440 provided by the OS 420. The output data transmitted to the image forming apparatus 102 includes, for example, information identifying the target character code, print data that can be output by the image forming apparatus 102, text data, and the like.

The image forming apparatus 102 that has received the output data prints the print data created with the target character code included in the output data received from the transmission unit 407 or displays the text data created with the target character code.

<Processing Flow>

Processing flow of the information processing method according to the first embodiment is described below.

(First Processing by Information Processing Apparatus)

FIG. 7 is a first sequence diagram illustrating processing executed by the information processing apparatus according to the first embodiment.

In step S701, when the drawing control unit 401 receives output target data sent from the application 410 through the OS 420, processing of step S702 and subsequent steps are executed. The character code of the output data accepted through the OS 420 is, for example, UTF-16 (Unicode).

In step S702, in response to receiving the output target data, the drawing control unit 401 requests the setting information acquisition unit 402 to acquire setting information on the language used by the user.

The setting information related to the language used by the user is, for example, the language ID representing the display language of the user acquired by the above-described GetUserDefaultUILanguage function. Alternatively, the setting information related to the language used by the user may be the language ID indicating the default language of the user acquired by the above-described GetUserDefaultLangID function.

In step S703, the setting information acquisition unit 402 acquires setting information (language ID) of the display language of the user using, for example, the above-described GetUserDefaultUILanguage function. For example, when the GetUserDefaultUILanguage function is executed in a Japanese-language environment, the language ID "0x411" is acquired.

In step S704, the setting information acquisition unit 402 notifies the drawing control unit 401 of setting information (language ID) of the display language of the user.

In step S705, the drawing control unit 401 notifies the output data generation unit 406 of the output target data together with the setting information (language ID) of the display language of the user notified from the setting information acquisition unit 402.

In step S706, the output data generation unit 406 notifies the character code identification unit 404 of the received setting information (language ID) of the display language of the user.

In step S707, the character code identification unit 404 requests the correspondence acquisition unit 403 to acquire the correspondence between the display language 501 and the code page 502 stored in, for example, the conversion table 408 as illustrated in FIG. 5.

In step S708, the correspondence acquisition unit 403 reads, for example, a conversion table 408 as illustrated in FIG. 5.

In step S709, the correspondence acquisition unit 403 notifies the character code identification unit 404 of the correspondence between the language ID and the code page 502 stored in the conversion table 408 as illustrated in FIG. 5, for example. Alternatively, the correspondence acquisition unit 403 may transmit the acquired conversion table 408 to the character code identification unit 404 as is.

In step S710, the character code identification unit 404 associates the setting information (for example, language ID "0x411") of the user's display language accepted in step S706 with the correspondence between the language ID and the code page 502 as illustrated in FIG. 5 and identifies the target character code based on the correspondence.

For example, when the language ID acquired by the setting information acquisition unit 402 is "0x411", the character code identification unit 404 identifies the language ID from the correspondence between the language ID and the code page 502 as illustrated in FIG. 5 and acquires the code page "932" for the language ID "0x411". Also, as described above, since the code page "932" corresponds to the character code "Shift-JIS", the character code identification unit 404 can identify "Shift-JIS" as the target character code.

In step S711, the character code identification unit 404 notifies the output data generation unit 406 of the identified target character code or the code page for the target character code. Since the character code and the code page match, the character code can be converted into the code page or the code page can be converted into the character code.

In step S712, the output data generation unit 406 notifies the character code conversion unit 405 of the character string to be converted (character string included in the output target data) and the code page (for example, code page "932") for the target character code.

In step S713, the character code conversion unit 405 converts the character code (for example, Unicode) of the character string into the target character code (for example, Shift-JIS) using the above-described WideCharToMultiBite function and the specified code page.

In step S714, the character code conversion unit 405 notifies the output data generation unit 406 of the converted character string obtained by converting the character code.

In step S715, the output data generation unit 406 generates output data (for example, print data, text data, etc.) that can be output by the image forming apparatus 102 using the converted character string converted by the character code conversion unit 405.

In step S716, the output data generation unit 406 notifies the transmission unit 407 of the generated output data together with the target character code.

In step S717, the transmission unit 407 transmits the output data notified from the output data generation unit 406 and the target character code to the image forming apparatus 102 through the spooler 440 provided by the OS 420.

(Second Processing of Information Processing Apparatus)

Note that the processing illustrated in FIG. 7 is an example. Alternatively, for example, processing of steps S706 to S711 in FIG. 7 may be executed under control of the drawing control unit 401, as described below.

FIG. 8 is a second sequence diagram illustrating processing executed by the information processing apparatus according to the first embodiment. The processing illustrated in steps S701 to S704 in FIG. 8 is the same as the processing in steps S701 to S704 in FIG. 7, and thus the description thereof is omitted here. Moreover, since the basic processing illustrated in FIG. 8 is the same as the processing illustrated in FIG. 7, detailed description of the same processing is omitted here.

In step S801, the drawing control unit 401 notifies the character code identification unit 404 of a determination request for determining the target character code. The determination request includes the setting information (language ID) of the display language of the user acquired by the setting information acquisition unit 402.

In step S802, the character code identification unit 404 requests the correspondence acquisition unit 403 to acquire the correspondence between the display language 501 and the code page 502 stored in, for example, the conversion table 408 as illustrated in FIG. 5.

In step S803, the correspondence acquisition unit 403 reads, for example, the conversion table 408 as illustrated in FIG. 5.

In step S804, the correspondence acquisition unit 403 notifies the character code identification unit 404 of the correspondence between the language ID and the code page 502 stored in the conversion table 408 as illustrated in FIG. 5, for example. Alternatively, the correspondence acquisition unit 403 may notify the drawing control unit 401 of the acquired conversion table 408.

In step S805, the character code identification unit 404 identifies the target character code based on the setting information of the display language of the user received in step S801 and the correspondence between the language ID and the code page 502 as illustrated in FIG. 5.

In step S806, the character code identification unit 404 notifies the drawing control unit 401 of the identified target character code or the code page for the target character code.

In step S807, the drawing control unit 401 notifies the output data generation unit 406 of a generation request to request generation of output data. The generation request includes, for example, the output target data accepted in step S701 and the code page for the target character code determined in step S805.

In step S808, the output data generation unit 406 notifies the character code conversion unit 405 of the character string to be converted and the code page for the target character code.

In step S809, the character code conversion unit 405 converts the character code of the character string into the target character code, using the WideCharToMultiBite function and the designated code page.

In step S810, the character code conversion unit 405 notifies the output data generation unit 406 of the converted character string obtained by converting the character code.

In step S811, the output data generation unit 406 generates output data that can be output by the image forming apparatus 102 using the converted character string converted by the character code conversion unit 405.

In step S812, the output data generation unit 406 notifies the transmission unit 407 of the generated output data together with the target character code.

In step S813, the transmission unit 407 transmits the output data notified from the output data generation unit 406 and the target character code to the image forming apparatus 102 through the spooler 440 provided by the OS 420.

The printer driver 430 of the information processing apparatus 101 converts the character code to the character code for the display language of the user and transmits output data even if the character string supported by the image forming apparatus 102 is not known.

Therefore, according to the present embodiment, even if the information processing apparatus 101 cannot identify the image forming apparatus 102 at the output destination and the character code supported by the image forming apparatus 102 is not known, the incidence of garbled characters on the image forming apparatus 102 side can be reduced.

Second Embodiment

As described above, when the printer driver 430 is a V4 printer driver, the drawing unit 432 of the printer driver 430 operates with the authority of the system. Therefore, setting information on the display language used by the user is acquired after the impersonation described in the second embodiment below.

In the second embodiment, an example of processing when the printer driver 430 is a V4 printer driver is described.

<Functional Configuration>

Figure 9:
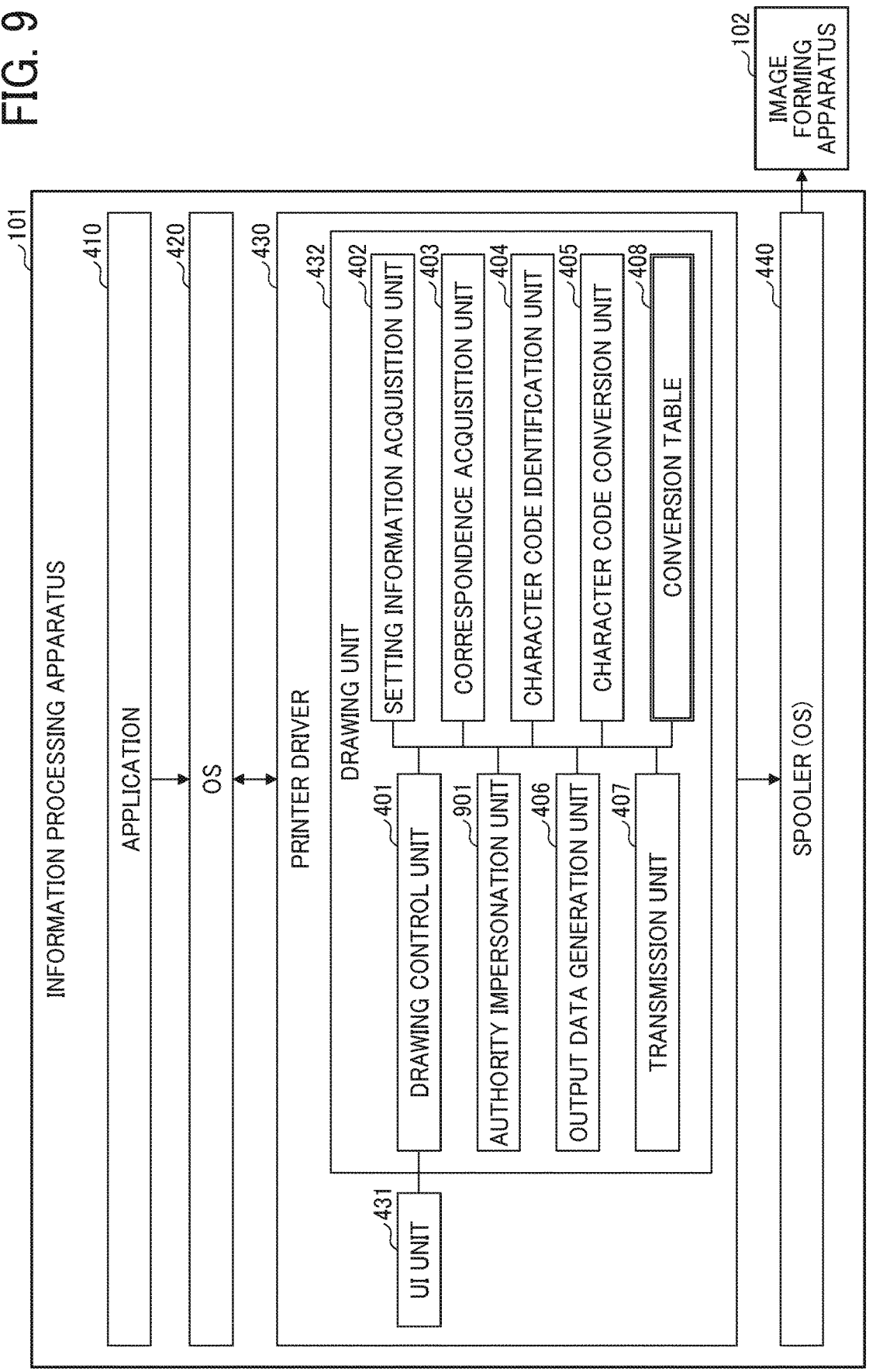
FIG. 9 is a block diagram illustrating a functional configuration of the information processing apparatus according to a second embodiment of the present disclosure.

FIG. 9 is a block diagram illustrating a functional configuration of the information processing apparatus according to the second embodiment. As illustrated in FIG. 9, the drawing unit 432 according to the second embodiment has an authority impersonation unit 901 in addition to the functional configuration of the drawing unit 432 according to the first embodiment illustrated in FIG. 4.

The authority impersonation unit 901 impersonates the authority of the user for the output target data for the OS 420 to execute the processing of the setting information acquisition unit 402.

In the V4 printer driver, the drawing unit 432 operates with the authority of the system. However, with the system authority, even if the GetUserDefaultUILanguage function is used, setting information (for example, a language ID) on the language used by the user for the output target data cannot be acquired.

Therefore, the authority impersonation unit 901, for example, acquires the user token of the user for the output target data. Using the acquired user token, the authority impersonation unit 901 launches the InpersonateLoggedOnUser function, which is the API of Windows OS, to impersonate the user's authority. By executing the GetUserDefaultUILanguage function with user's authority, obtaining setting information on the language used by the user for the print target data becomes possible.

After the setting information acquisition unit 402 acquires setting information on the language used by the user, the authority impersonation unit 901 executes the RevertToSelf function, which is the API of Windows OS, to terminate the impersonation.

Note that the user token of the user for the output target data is acquired, for example, by designating XPS_FP_USER_TOKEN in the IPrintPipelinePropertyBag:: GetProperty function, which is the API of Windows OS.

The functional configuration of the information processing apparatus 101 other than the above may be the same as the functional configuration of the information processing apparatus 101 according to the first embodiment illustrated in FIG. 4.

<Processing Flow>

(Acquiring Setting Information)

Figure 10:
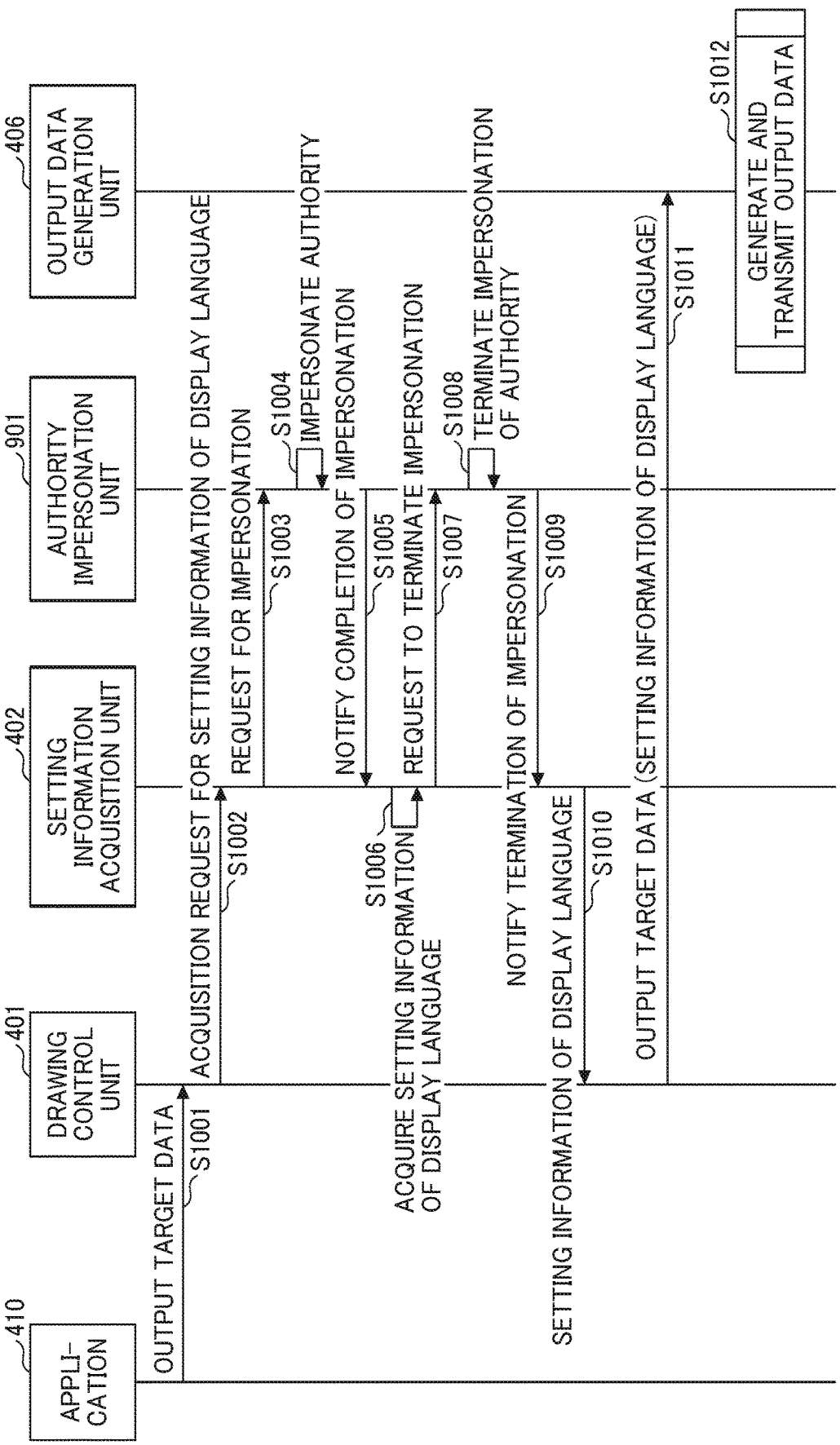
FIG. 10 is a sequence diagram illustrating an example of acquisition processing of setting information according to the second embodiment of the present disclosure.

FIG. 10 is a sequence diagram illustrating an example of acquisition processing of setting information according to the second embodiment. This processing is obtained by adding the processing by the authority impersonation unit 901 to the processing of the information processing apparatus illustrated in FIG. 7. Therefore, detailed description of processing other than the authority impersonation unit 901 is omitted here.

In step S1001, when the drawing control unit 401 receives output target data sent from the application 410 through the OS 420, processing of step S1002 and subsequent steps are executed.

In step S1002, upon receiving the output target data, the drawing control unit 401 requests the setting information acquisition unit 402 to acquire setting information on the language used by the user.

In step S1003, the setting information acquisition unit 402 requests the authority impersonation unit 901 to impersonate the authority.

In step S1004, the authority impersonation unit 901 impersonates the user authority for the output target data instead of the system authority to operate the drawing unit 432.

For example, the authority impersonation unit 901 acquires the user token of the user for the output target data by designating XPS_FP_USER_TOKEN in the above-described IPrintPipelinePropertyBag:: GetProperty function.

Also, using the acquired user token, the authority impersonation unit 901 launches the aforementioned InpersonateLoggedOnUser function to impersonate the user's authority.

In step S1005, the authority impersonation unit 901 notifies the setting information acquisition unit 402 that the impersonation of the authority is completed. In step S1006, the setting information acquisition unit 402 acquires setting information (language ID) of the display language of the user, for example, by using the GetUserDefaultUILanguage function, as in the first embodiment.

In step S1007, the setting information acquisition unit 402 requests the authority impersonation unit 901 to terminate the impersonation of the authority. In step S1008, for example, the authority impersonation unit 901 executes the above-described RevertToSelf function to terminate the impersonation. Also, in step S1009, the authority impersonation unit 901 notifies the setting information acquisition unit 402 that the impersonation is terminated.

In step S1010, the setting information acquisition unit 402 notifies the drawing control unit 401 of setting information (language ID) of the display language of the user.

In step S1011, the drawing control unit 401 notifies the output data generation unit 406 of the output target data together with the setting information (language ID) of the display language of the user notified from the setting information acquisition unit 402.

In step S1012, the output data generation unit 406 uses the correspondence acquisition unit 403, the character code identification unit 404, the character code conversion unit 405, the transmission unit 407, and the like to output data as illustrated in steps S706 to S717 in FIG. 7 to generate and transmit the output data.

By the above processing, even when the printer driver 430 is a V4 printer driver, the information processing apparatus 101 can execute the same processing as that of the first embodiment.

Third Embodiment

As described above, when the check box 1501 of "Use Unicode UTF-8 for World Wide Language Support" is selected on the system locale setting screen 1500 of the OS 420 as illustrated in FIG. 15, character information from the OS becomes UTF-8. Therefore, for example, when the image forming apparatus 102 does not support the UTF-8 character code, characters may be garbled.

In a third embodiment, an example of the processing described in the first and second embodiments with the settings of the system locale that the drawing unit 432 acquired from the OS 420 set to UTF-8 (predetermined character code) is described.

Here, although the functional configuration of the information processing apparatus 101 is assumed to be the same as the functional configuration of the information processing apparatus 101 according to the first embodiment illustrated in FIG. 4, the third embodiment can also be applied to the second embodiment.

<Functional Configuration>

Figure 11:
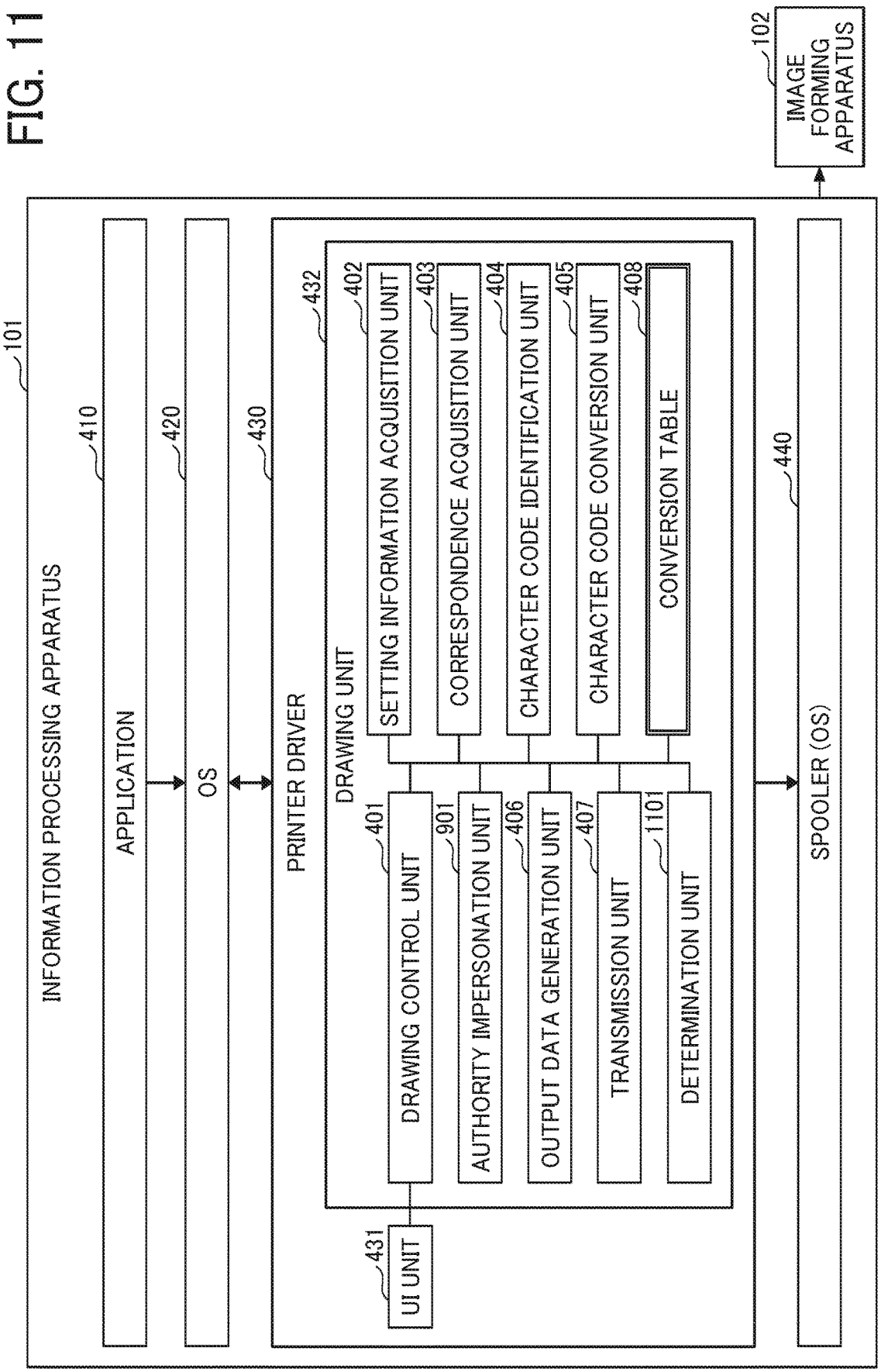
FIG. 11 is a block diagram illustrating a functional configuration of the information processing apparatus according to a third embodiment of the present disclosure.

FIG. 11 is a block diagram illustrating a functional configuration of the information processing apparatus according to the third embodiment. As illustrated in FIG. 11, the drawing unit 432 according to the third embodiment includes the determination unit 1101 in addition to the functional configuration of, for example, the drawing unit 432 according to the second embodiment illustrated in FIG. 9 or the drawing unit 432 according to the first embodiment illustrated in FIG. 4.

The determination unit 1101 determines whether the settings of the system locale in the OS 420 of the information processing apparatus 101 is set to a predetermined character code. For example, the determination unit 1101 determines whether the check box 1501 of "Use Unicode UTF-8 for worldwide language support" is selected on the system locale setting screen 1500 of the OS 420 as illustrated in FIG. 15. The predetermined character code is any character encoding capable of encoding all possible characters and may be previously determined according to the OS in use.

In the third embodiment, the processing to reduce the incidence of garbled characters described in the first embodiment (or the second embodiment) is performed when the determination unit 1101 determines that the settings of the system locale of the OS 420 is set to a predetermined character code, for example, UTF-8.

<Processing Flow>

(Processing by the Drawing Unit)

Figure 12:
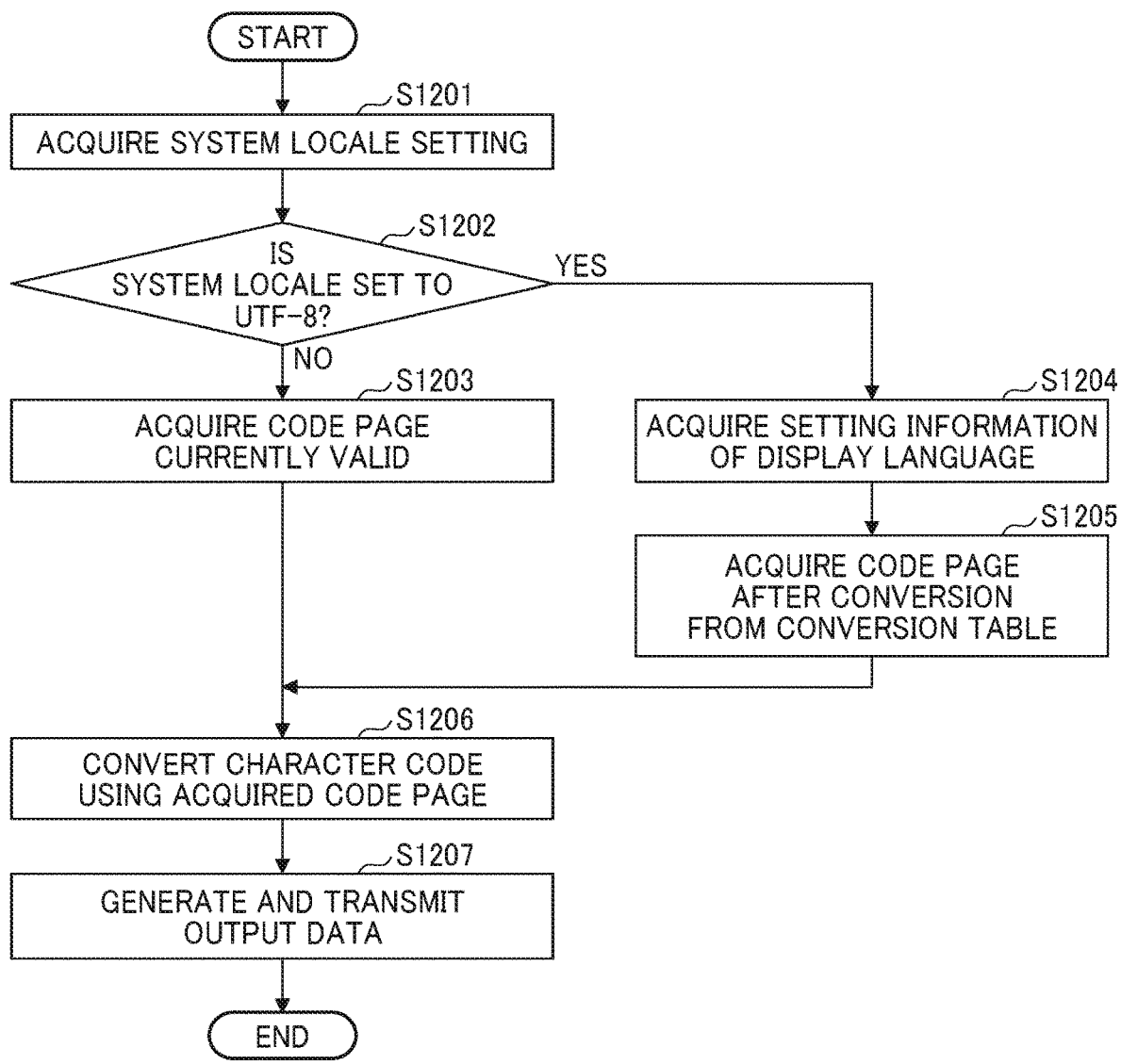
FIG. 12 is a flowchart illustrating an example of processing of a drawing unit according to the third embodiment of the present disclosure.

FIG. 12 is a flowchart illustrating an example of processing of the information processing apparatus according to the third embodiment. The processing is executed when the drawing unit 432 according to the third embodiment receives output target data from the application 410 through the OS 420, for example.

In step S1201, when the drawing control unit 401 receives output target data, the determination unit 1101 acquires the settings of the system locale from the OS 420 as illustrated, for example, in FIG. 15.

In step S1202, the determination unit 1101 determines whether the acquired settings of the system locale is set to UTF-8.

When the acquired settings of the system locale is not set to UTF-8, the determination unit 1101 shifts the processing to step S1203. On the other hand, when the settings of the acquired system locale is set to UTF-8, the determination unit 1101 shifts the processing to step S1204.

When the processing proceeds from step S1202 to step S1203, the drawing control unit 401 acquires a code page (code page identifier) that is currently valid from the OS 420. For example, the drawing control unit 401 can obtain the code page currently valid by executing GetACP function, which is the API of Windows OS.

On the other hand, when the processing proceeds from step S1202 to step S1204, the drawing control unit 401 executes, for example, the processing of steps S702 to S704 in FIG. 7 to acquire setting information (for example, language ID) of the display language of the user.

In step S1205, the output data generation unit 406 uses the character code identification unit 404 to execute, for example, the processing in steps S706 to S711 of FIG. 7 to acquire the code page (or the target character code) for the target character code.

In step S1206, the character code conversion unit 405 executes the processing of step S713 in FIG. 7 using the code page acquired in step S1203 or step S1205 to convert the character code of the character string included in the output target data.

In step S1207, the output data generation unit 406 and the transmission unit 407 execute the processing of steps S715 to S717 in FIG. 7 to generate output data and transmit to the image forming apparatus 102 through the spooler 440 provided by the OS 420.

(Processing when Character Code is not Set to UTF-8)

Figure 13:
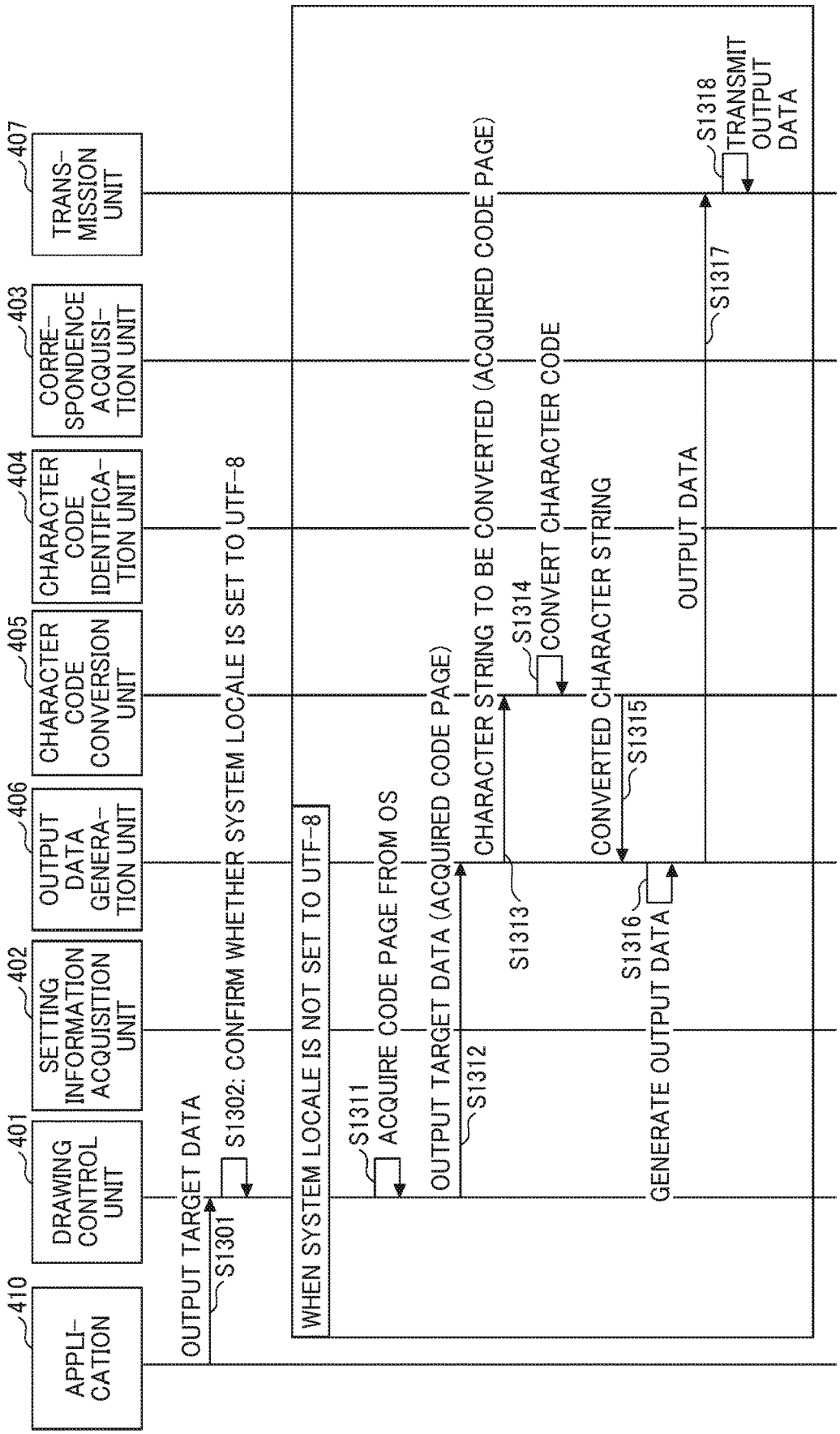
FIG. 13 is a sequence diagram illustrating an example of processing when character code is not set to UTF-8 according to the third embodiment of the present disclosure.

FIG. 13 is a sequence diagram illustrating an example of processing when character code is not set to UTF-8 according to the third embodiment.

When the determination unit 1101 determines in step S1202 of the processing illustrated in FIG. 12 that the character code is set to UTF-8, the information processing apparatus 101 executes, for example, the processing illustrated in steps S702 to S717 of FIG. 7.

On the other hand, when the determination unit 1101 determines in step S1202 of the processing illustrated in FIG. 12 that the character code is not set to UTF-8, the information processing apparatus 101 executes, for example, the processing illustrated in steps S1311 to S1318 of FIG. 13.

In step S1301, when the drawing control unit 401 receives output target data sent from the application 410 through the OS 420, processing of step S1302 is executed.

In step S1302, the determination unit 1101 confirms whether the settings of the system locale is set to UTF-8. This processing corresponds to the processing of steps S1201 and S1202 in FIG. 12.

When the settings of the system locale is not set to UTF-8, the processing of steps S1311 to S1318 is performed.

In step S1311, the drawing control unit 401 acquires the code page currently valid from the OS 420, for example, by executing the above-described GetACP function. For example, when the OS 420 is executed in a Japanese-language environment, "932", which is the identifier of the code page for Japanese, is acquired.

In step S1312, the drawing control unit 401 notifies the output data generation unit 406 of the output target data together with the code page acquired in step S1311.

In step S1313, the output data generation unit 406 notifies the character code conversion unit 405 of the character string to be converted (character string included in the output target data) and the code page (for example, code page "932") acquired in step S1311.

In step S1314, the character code conversion unit 405 converts the character code (for example, Unicode) of the character string into the target character code (for example, Shift-JIS) using the WideCharToMultiBite function and the specified code page.

In step S1315, the character code conversion unit 405 notifies the output data generation unit 406 of the converted character string obtained by converting the character code.

In step S1316, the output data generation unit 406 generates output data that can be output by the image forming apparatus 102 using the converted character string converted by the character code conversion unit 405.

In step S1317, the output data generation unit 406 notifies the transmission unit 407 of the generated output data together with the target character code.

In step S1318, the transmission unit 407 transmits the output data notified from the output data generation unit 406 and the target character code to the image forming apparatus 102 through the spooler 440 provided by the OS 420.

By the above processing, when the settings of the system locale of the OS 420 is set to UTF-8, the processing for reducing the incidence of garbled characters illustrated in the first embodiment (or the second embodiment) can be selectively executed. As a result, when the settings of the system locale of the OS 420 is not set to UTF-8, the printer driver 430 can execute the same processing as in the past to maintain compatibility.

As described above, according to each embodiment of the present disclosure, even when the information processing apparatus 101 cannot recognize the image forming apparatus 102 as the output destination and does not know which character codes the image forming apparatus 102 supports, the incidence of garbled characters on the image forming apparatus side can be reduced.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
a memory configured to store a conversion table therein, the conversion table indicating which of a plurality of code pages correspond to setting information associated with a language, the plurality of code pages identifying respective ones of a plurality of encoding schemes associating a set of characters with unique character codes; and
circuitry configured to:
determine a language which a display device of the information processing apparatus utilizes to display data to a user of the information processing apparatus;
identify, via the conversion table, the setting information on the language;
identify, in the conversion table, a code page corresponding to the setting information from among the plurality of code pages;
identify a target character code based on the code page; and
convert a character code of data to be output to an external device into the target character code based on the encoding scheme associated with the code page.

2. The information processing apparatus of claim 1, wherein the setting information is information on a display language which is set in association with a user in an operating system of the information processing apparatus.

3. The information processing apparatus of claim 1, wherein the setting information is information on a format of a date to be displayed on the display device by the information processing apparatus.

4. The information processing apparatus of claim 1, wherein the circuitry is further configured to:
determine whether settings of a system locale in an operating system of the information processing apparatus are a set character code; and
convert the predetermined character code into the target character code when system locale is set to the set character code.

5. The information processing apparatus of claim 4, wherein the set character code includes UTF-8.

6. The information processing apparatus of claim 1, wherein the circuitry is further configured to impersonate user authority to acquire setting information that cannot be acquired with system authority.

7. The information processing apparatus of claim 1, wherein the circuitry is further configured to:
store a default value of the code page; and
determine the default value of the code page as the target character code when the target character code cannot be determined based on the setting information and the code page.

8. The information processing apparatus of claim 1, wherein the external device is an image forming apparatus that stores font data for a plurality of character codes and outputs characters using the font data.

9. The information processing apparatus of claim 1, wherein the circuitry is configured to automatically acquire the setting information from an operating system of the information processing apparatus and to convert the character code of the data to be output into the target character code by calling an API associated with the operating system.

10. The information processing apparatus of claim 1, wherein the setting information is a hexadecimal identifying the language.

11. An information processing method comprising:
determine a language which a display device of the information processing apparatus utilizes to display data to a user of an information processing apparatus;
read, from a memory, a conversion table indicating which of a plurality of code pages correspond to setting information associated with a language, the plurality of code pages identifying respective ones of a plurality of encoding schemes associating a set of characters with unique character codes;
identify, via the conversion table, setting information on the language;
identify, in the conversion table, a code page corresponding to the setting information from among the plurality of code pages;
identifying a target character code based on the code page; and
converting character code of data to be output to an external device into the target character code based on the encoding scheme associated with the code page.

12. The information processing method of claim 11, wherein the setting information is information on a display language which is set in association with a user in an operating system of the information processing apparatus.

13. The information processing method of claim 11, wherein the setting information is information on a format of a date to be displayed on the display device by the information processing apparatus.

14. The information processing method of claim 11, further comprising:
  determining whether settings of a system locale in an operating system of the information processing apparatus are a set character code; and
  converting the set character code into the target character code when the system locale is set to the set character code.

15. The information processing method of claim 11, further comprising:
  impersonating user authority to acquire setting information that cannot be acquired with system authority.

16. A non-transitory recording medium storing instructions which, when executed by one or more processors, cause the processors to:
  determine a language which a display device of the information processing apparatus utilizes to display data to a user of the information processing apparatus;
  read, from a memory, a conversion table indicating which of a plurality of code pages correspond to setting information associated with a language, the plurality of code pages identifying respective ones of a plurality of encoding schemes associating a set of characters with unique character codes;
  identify, via the conversion table, setting information on the language;
  identify, in the conversion table, a code page corresponding to the setting information from among the plurality of code pages;
  identify a target character code based on the code page; and
  converting a character code of data to be output to an external device into the target character code based on the encoding scheme associated with the code page.

17. The non-transitory recording medium of claim 16, wherein the setting information is information on a display language which is set in association with a user in an operating system of the information processing apparatus.

18. The non-transitory recording medium of claim 16, wherein the setting information is information on a format of a date to be displayed on the display device by the information processing apparatus.

19. The non-transitory recording medium of claim 16, wherein the instructions further configure the one or more processors to:
  determine whether settings of a system locale in an operating system of the information processing apparatus are a set character code; and
  convert the set character code into the target character code when the system locale is set to the set character code.

20. The non-transitory recording medium of claim 16, wherein the instructions further configure the one or more processors to,
  impersonate user authority to acquire setting information that cannot be acquired with system authority.

* * * * *